April 29, 1969  J. J. HENRY  3,441,228
END TURN SHAPING AND POSITIONING APPARATUS
FOR STATOR WINDING MACHINE Filed March 21, 1966

INVENTOR.
John J. Henry,
BY Hood, Gust & Diehl
Attorneys

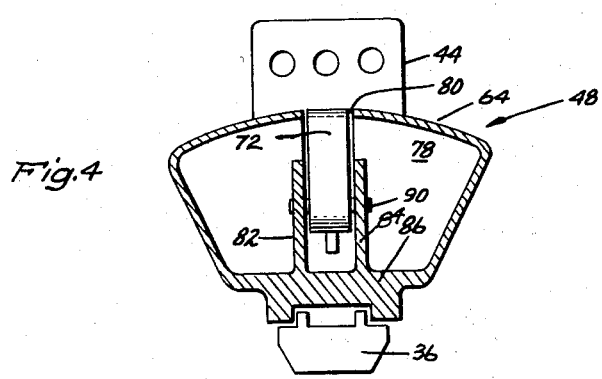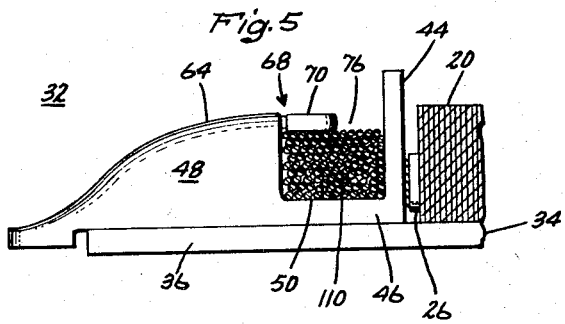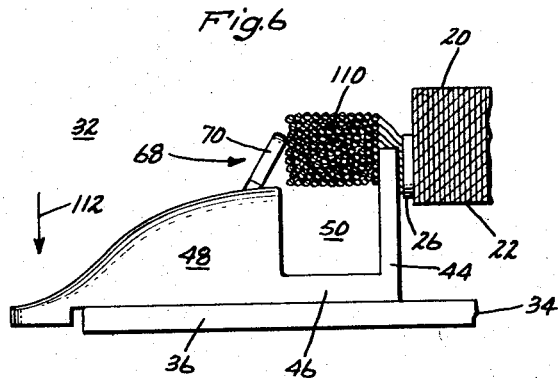

United States Patent Office 3,441,228
Patented Apr. 29, 1969

3,441,228
END TURN SHAPING AND POSITIONING APPARATUS FOR STATOR WINDING MACHINE
John J. Henry, Fort Wayne, Ind., assignor to Fort Wayne Tool & Die, Inc., Fort Wayne, Ind., a corporation of Indiana
Filed Mar. 21, 1966, Ser. No. 535,845
Int. Cl. B65h 81/06
U.S. Cl. 242—1.1    10 Claims

ABSTRACT OF THE DISCLOSURE

An end turn shaping and positioning apparatus is placed on a stator core for machine winding in which one or more supports extend axially from opposite ends of the core. Each of the extending ends supports a guiding shroud member shaped to define a radially outwardly facing, open-ended, U-shaped channel to receive the turns of wire as they are wound onto the core. Each shroud member carries a finger spring-biased toward the adjacent end face of the core to partially block the channel and thereby retain and shape the end turns of the coils wound but being pivotable against said spring bias to permit the apparatus to be removed from the core.

---

This invention relates generally to machines for winding coils into internally slotted dynamoelectric machine core members, and more particularly to apparatus for shaping and positioning the end turns of such coils.

Gun-type stator winding machines are well known in the art conventionally comprising a winding head or gun having a wire dispensing needle on its outer surface, the head being moved reciprocally through the bore of the stator to be wound and also having limited rotational movement adjacent the ends of its stroke. Movement of the gun through the stator bore in one direction thus carries a wire therethrough to form one side of a coil with the rotational movement of the gun at the end of the stroke forming one end turn; the next axial movement of the gun in the opposite direction back through the bore forms the other side of the coil; and finally the next rotational movement of the gun restores the wire dispensing needle to its original position forming the other end turn, thus completing one turn of the coil being wound. Such a gun-type stator winding machine is described and illustrated in Patent No. 3,025,008 to Richard G. Nill and Robert J. Eminger and assigned to the assignee of the present application.

It is desirable that the end turns at the opposite end faces of the stator core member be arcuate in configuration, however, since the wire dispensed by the needle on the gun is maintained under appreciable tension, the wire forming the end turns tends to follow a chord, which, in the case of coils of larger pitch, may extend across the bore. It is therefore desirable to shape and position the end turns away from the bore and numerous arrangements, such as various hooks and shroud or horn members, have been employed in gun-type winding machines for this purpose. The shrouds commonly employed in such machines have conventionally comprised a pair of shroud members respectively mounted at opposite ends of the stator core member being wound and extending axially outwardly therefrom, each such shroud member having an enlarged bulb portion formed on the end thereof spaced from the respective end face of the stator core member and forming a radially outwardly facing slot therewith. With this arrangement, the wire dispensing needle on the winding gun moves outwardly from the bore of the stator core member carrying the wire past a side of the respective shroud member, rotation of the gun at the end of its stroke thus causing the wire to form a loop around the respective bulb portion and subsequent axial movement of the gun and the wire dispensing needle in the opposite direction back through the stator bore thus pulling the wire loop along the outer surface of the bulb and into the slot thereby to form an end turn at the respective end face of the stator core member.

With conventional shroud members, there is a tendency for the end turns of the higher pitched coils to pile up at the forward side of the slot adjacent the bulb portion of the shroud member resulting in the end turns having an excessive outside diameter and the further tendency for the end turns to spring inwardly toward the bore. This excessive outside diameter and tendency for the end turns to spring inwardly has thus required a separate end turn forming operation following winding of the stator core member. This operation not only adds time and expense, but also tends to roll the end turns one over the other resulting in stretching and bending of the end turns and abrasion of the insulation thereon.

It is therefore desirable initially to shape the end turns of each coil into generally rectangular cross-section during the winding operation. In accordance with the invention, this shaping is accomplished by the provision of a projection or finger extending axially from the bulb portion of the shroud member adjacent its outer surface toward the respective end face of the stator core member, this projection thus preventing excessive build-up of the end turns adjacent the bulb and resulting in the provision of end turns shaped in a generally rectangular cross-section. However, such a projection will inhibit or prevent removability of a shroud member radially inwardly into the bore after the winding operation is completed and therefore, in further accordance with the invention, the projection is movable to a position which opens the slot so as to permit removability of the shroud from the end turns.

It is accordingly an object of the invention to provide improved end turn shaping and positioning apparatus for use with a machine for winding coils into the slots of an internally slotted dynamoelectric machine stator core member.

Another object of the invention is to provide improved end turn shaping and positioning apparatus which will shape the end turns of each coil into generally rectangular cross-section.

A further object of the invention is to provide improved end turn shaping and positioning apparatus which will shape the end turns into generally rectangular cross-section and which may readily be removed from the fully wound coils.

The above-mentioned and other features and objects of the invention and the manner of attaining them will become more apparent and the invention itself will be best understood by reference to the following description of an embodiment of the invention taken in conjunction with the accompanying drawings, wherein:

FIG. 4 is a cross-sectional view taken along the line 4—4 of FIG. 3; and

FIGS. 5 and 6 are side views illustrating the mode of operation of the invention.

Figure 1:
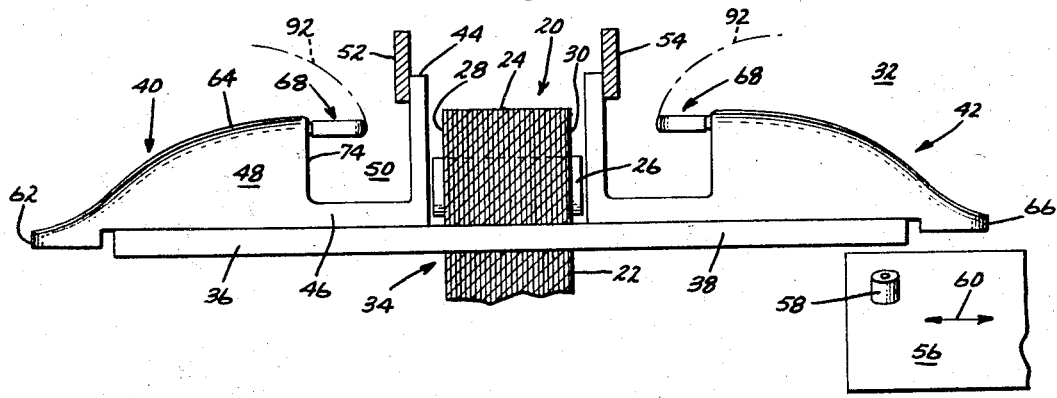
FIG. 1 is a side view, partly in cross-section, illustrating the end turn shaping and positioning apparatus of the invention.

Referring now to the figures of the drawings, there is shown a conventional laminated, internally slotted, dynamoelectric machine stator core member 20 having a bore 22 with a plurality of winding slots 24 communicating therewith. Conventional slot liners or insulators are positioned in each of the slots 24 and have cuff portions 26 extending outwardly at each end face 28, 30 of the core 20.

One of the improved shroud devices of the invention, generally indicated at 32, is provided for each pole group of coils to be wound on the stator core member 20, e.g., two (2) in the case of a two-pole machine. Each of the shroud devices 32 comprises a center portion 34 which extends through the bore 22 of the core member 20 and having elongated extension portions 36, 38 extending axially outwardly therefrom. Shroud members 40, 42 are respectively adjustably secured to the extension portions 36, 38 of member 34 in order to accommodate stator core members having different stack heights.

Each of the shroud members 40, 42 comprises a mounting portion 44, a base portion 46 and a bulb portion 48 respectively defining a radially outwardly facing end-turn receiving slot 50. Mounting portions 44 extend radially outwardly from the inner ends of base portions 46 over the cuff portions 26 of the slot liners and the end faces 28, 30 of the core 20, as shown. The mounting portions 44 are respectively secured at their outer ends to conventional rings 52, 54 and this entire assembly is secured to the winding machine which may be of the type shown in the aforesaid Patent No. 3,025,008.

Winding machine (otherwise not shown) is provided with a conventional gun 56 having wire dispensing needles 58 thereon corresponding in number ot the number of pole groups to be wound. Gun 56 is adapted to be moved reciprocally through the bore 22 of the stator core member 20, as shown by the arrows 60, and to be oscillated at the ends of its stroke; these motions may be imparted to the gun 56 by the mechanism shown in the aforesaid Patent No. 3,025,008. Thus, in operation, the gun 56 will move through the bore 22 of the core 20 in one direction with the wire dispensing needle 58 passing through one slot in which a coil is being wound. When the needle 58 reaches a position axially beyond one end of the shroud device 32, such as end 62 of bulb portion 48 of the shroud member 40, the gun is rotated thereby looping the wire around the outer end of the bulb portion 48. The gun then moves back through the bore 22 with the needle 58 moving through another slot with the loop of wire which has been formed around bulb portion 48 being pulled over its outer surface 64 and into the slot 50 thereby forming one end turn. When the needle 58 reaches a point axially beyond the other end 66 of shroud member 42, the gun 56 is rotated again to return needle 58 back to its original position.

Figure 2:
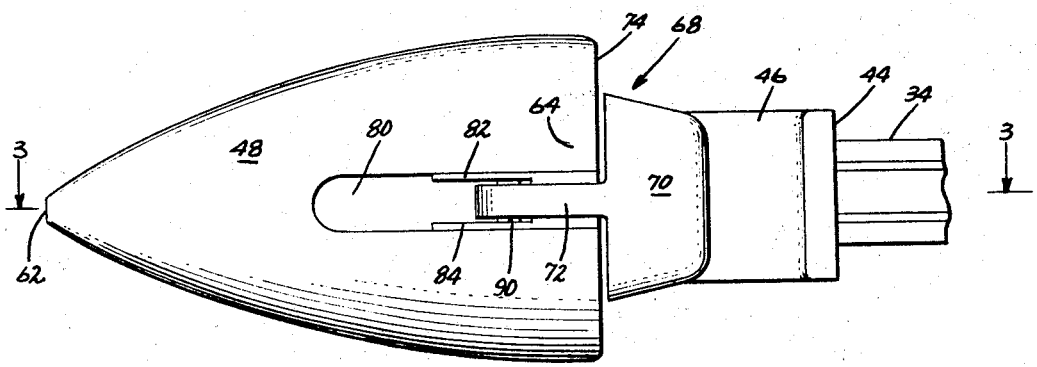
FIG. 2 is a top view of the embodiment of FIG. 1.
Figure 3:
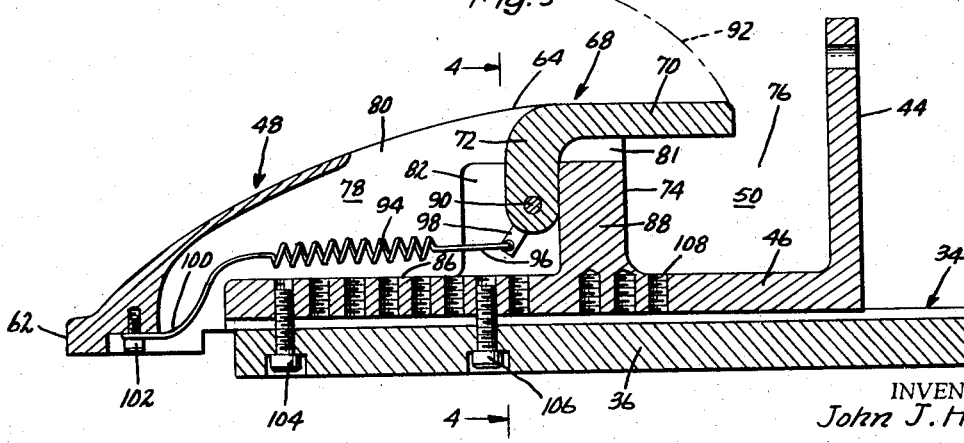
FIG. 3 is a cross-sectional view taken along the line 3—3 of FIG. 2.

In order to shape the wires in the slot 50 which form the end turns, a finger member 68 is provided having a flat projecting portion 70 and an extension portion 72. Finger 68 has a normal position, as shown in solid lines in FIGS. 2 and 3, in which the flat projecting portion 70 extends axially from end 74 of bulb portion 48 toward the mounting portion 44, but terminating short of the mounting portion 44, thereby defining opening 76 which communicates with the slot 50, the outer surface of the finger member 68 in its normal position being generally flush with the outer surface 64 of the bulb 48 adjacent end 74. Flat portion 70 of the finger member 68 thus overlays the forward portion of slot 50 defining a generally rectangular space, as best seen in FIG. 3.

Bulb 48 has an interior cavity 78 with an axially extending slot 80 formed in its outer surface 64 communicating therewith, slot 80 extending to and communicating with the end 74, as at 81. A pair of transversely, spaced-apart projections 82, 84 are provided in the cavity 78 extending upwardly from the base 86 and forwardly from the rear wall 88 of the bulb 48. Extension portion 72 of the finger member 68 is generally L-shaped and extends axially forwardly into the slot 80 and downwardly between the projections 82, 84 being pivotally mounted thereon by a suitable pin 90. Finger members 68 are thus pivotally mounted for movement away from their normal positions as shown by dashed lines 92.

Each finger member 68 is biased to its normal position by a suitable coil spring 94 in the cavity 78 of the bulb portion 48 having one end 96 engaging a projection 98 on the extension portion 72 and its other end 100 secured to the front end 62, as by a suitable threaded fastener 102. Shroud members 40, 42 are adjustably secured to the extensions 36, 38 of the member 34 by means of suitable threaded fasteners 104, 106, base portions 46, 86 having a plurality of suitably tapped openings 108 formed therein to permit axial adjustment of the shroud members 40, 42 in order to accommodate core members 20 having different stack heights.

Referring now to FIG. 5, with the shroud device 32 assembled on the core 20 as shown, the coils are wound by the gun 56 as above-described with the end-turn loops being formed around and drawn over the outer surface 64 of the bulb portions 48 and passing over the outer surface of flat portion 70 of the finger member 68 thereby entering slot 50 through opening 76 to form end turns 110. It will be observed that the projecting flat portions 70 of the finger member 68 confines the end turns 110 at the forward end of the slot 50 into a generally rectangular cross-section, the tension exerted by the coil spring 94 retaining member 68 in its normal position as shown.

Referring additionally to FIG. 6, when one coil or group of coaxial coils has been fully wound, the shroud device 32 is moved radially inwardly into the bore 22 of the stator core member 20, as shown by the arrow 112. This radial inward movement of the shroud device 32 causes the end turns 110 to engage the flat portion 70 of the finger member 68 and to pivot it to its second position, as shown in FIG. 6, thereby opening the slot 50 to permit removal of the end turns 110 therefrom, as shown in FIG. 6.

It will now be seen that the provision of the projection or flat portion 70 of the finger member 68 initially shapes the end turns 110 into a generally rectangular cross-section during the winding operation thereby eliminating the aforesaid tendency for the end turns to build-up adjacent end 74 of bulb 48 to provide an excessive outside diameter and also for the tendency for the end turns to spring inwardly toward the bore. It will further be seen that the pivotal mounting of the finger members 68 permit removal of the shroud devices 32 from the fully wound end turns 110 after the winding operation has been completed.

While there have been described above the principles of this invention in connection with specific apparatus, it is to be clearly understood that this description is made only by way of example and not as a limitation to the scope of this invention.

What is claimed is:

1. End turn shaping and positioning apparatus for a machine for winding coils into an internally slotted dynamoelectric machine core member having a bore and an end face, said apparatus comprising: a member adapted to be mounted in fixed relationship with respect to said core member and having a part extending axially outwardly from said end face, said part having a radially outwardly facing surface; shaping means on said part spaced axially outwardly from said end face and having forward and rear ends, said rear end being generally parallel with said end face and defining with said surface of said part a radially outwardly facing generally U-shaped slot which is open at its top and opposite sides for accommodating the end turns of said coils during the winding thereof; projection means on said rear end of said shaping means having a normal position spaced substantially radially outwardly from said surface of said part and parallel therewith and extending axially toward but terminating short of said end face, said projection means in said normal position thereof partially closing the top of said slot and overlaying the end turns therein for confining and shaping the same; and means mounting said projection means for movement to a second position to open the top of said slot thereby to permit removal of said apparatus from said end turns.

2. The apparatus of claim 1 wherein said mounting means comprises means pivotally mounting said projection means on said shaping means for movement between said normal and the second positions.

3. The apparatus of claim 1 further comprising spring means for biasing said projection means to said normal position thereof.

4. The apparatus of claim 1 wherein said mounting means comprises means for moving said projection means radially outwardly to said second position by said end turns and in response to said radially inwardly movement of apparatus into said bore.

5. The apparatus of claim 1 wherein said shaping means comprises an enlarged bulb member having an outer surface adjacent said rear end which is spaced radially outwardly from said surface of said part, said projection means in said normal position thereof extending axially from said rear end of said bulb member adjacent said outer surface thereof.

6. The apparatus of claim 5 wherein said projection means comprises a finger member, said mounting means pivotally mounting said finger member on said bulb member for movement between said normal and second positions, said finger member being pivoted to said second position thereof by said end turns in response to radially inward movement of said apparatus into said bore.

7. The apparatus of claim 6 further comprising spring means for biasing said finger member to said normal position thereof.

8. The apparatus of claim 1 wherein said member includes a mounting part extending radially outwardly from said first-named part adjacent said end face, said shaping means comprising an enlarged bulb member having an outer surface adjacent said rear end which is spaced radially outwardly from said surface of said first-named part, said rear end defining said slot with said mounting part, said projection means comprising a finger member having a flat portion and an extension portion, said bulb member having a cavity formed therein communicating with said outer surface and rear end, said flat portion of said finger member in said normal position extending axially toward said mounting part, said extension portion of said finger member extending into said cavity, said mounting means pivotally mounting said finger member in said cavity whereby said flat portion of said finger member is pivoted to said second position thereof by said end turns in response to radially inward movement of said apparatus into said bore.

9. The apparatus of claim 8 further comprising spring means in said cavity and connected to said extension portion of said finger member for biasing the same to said normal position thereof.

10. The apparatus of claim 8 wherein said flat portion of said finger member has an outer surface which is generally flush with said outer surface of said bulb member adjacent said rear end thereof when said finger member is in said normal position thereof.

References Cited

UNITED STATES PATENTS

| | | | |
|---|---|---|---|
| 2,847,170 | 8/1958 | Lill et al. | 242—1.1 |
| 2,988,291 | 6/1961 | Greene et al. | |
| 3,129,900 | 4/1964 | Greene. | |
| 3,281,084 | 10/1966 | Lill. | |

FOREIGN PATENTS 112,010    9/1964    Czechoslovakia.

BILLY S. TAYLOR, *Primary Examiner.*